Figures 1, 2, 3:
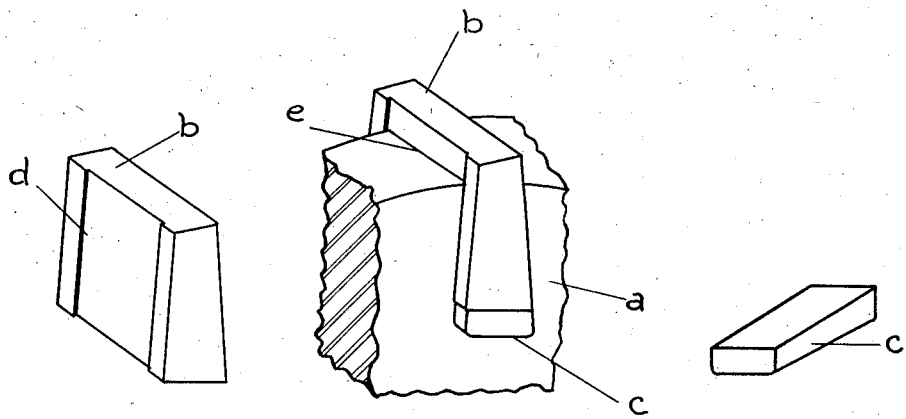

H. B. McDONALD.
SEPARABLE TOOTH CUTTER.
APPLICATION FILED APR. 27, 1920.

1,365,180.

Patented Jan. 11, 1921.

Inventor
Reuben L. Roberts
Attorney

UNITED STATES PATENT OFFICE.

HIRAM B. McDONALD, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

SEPARABLE-TOOTH CUTTER.

1,365,180.   Specification of Letters Patent.   Patented Jan. 11, 1921.

Application filed April 27, 1920. Serial No. 377,014.

*To all whom it may concern:*

Be it known that HIRAM B. McDONALD, a citizen of the United States of America, residing at Fitchburg, in the county of Worcester and Commonwealth of Massachusetts, has invented an Improvement in Separable-Tooth Cutters, of which the following is a specification.

This invention relates to cutters having inserted separable teeth, the form illustrated being particularly adapted to metal cutters, but it may be employed in any class of cutters by changing the form of the cutting end of the teeth to suit the purpose of their intended use.

The invention consists in a body portion having slots of a truncated wedge-shape, cut in a radial direction across its outer edge, or periphery when it is a cylinder, and teeth of a similar shape inserted in these slots, with a tapered key forced into the slot beneath each tooth to hold it firmly in a radial direction, and to prevent lateral or sidewise movement of the teeth in the slots, companion grooves and tenons are formed in radial direction in juxtaposed faces of the side of the slots and of the side of the teeth.

This construction produces a very secure and effective fastening for separable teeth and is relatively inexpensive.

In the drawings forming a part of this specification; Figure 1, is an elevation in perspective, of a truncated wedge-shaped tooth to be secured in a slot of similar shape in the periphery of the body of a cylindrical cutter; Fig. 2, shows a fragment of the body of the cutter with a truncated wedge-shaped tooth in the slot of similar shape in the body; Fig. 3, is a perspective view of the key to be inserted beneath the tooth.

Referring by designating characters to the several parts shown in the drawings, *a*, is the body of the cutter, *b*, the truncated wedge-shaped tooth, *c*, the tapered key beneath the tooth, *d*, the groove in the side of the tooth, and *e*, the tenon at one side of the slot in the body of the cutter, to prevent sidewise movement of the tooth in such slot.

The tooth is inserted laterally in the slot in the body of the cutter when the bottom of the tooth is resting on the bottom of the slot; the projecting edges at the sides of the groove in the tooth being sufficiently low to permit this; the tooth is then pushed upward in the slot and the tapered key *c*, is forced in beneath the tooth laterally of the body of the cutter to the position shown in Fig. 2, which holds the tooth firmly in place; the slightly projecting ledges at the sides of the groove therein preventing any lateral movement.

I claim:

A separable tooth cutting tool, comprising a body portion having slots of truncated wedge-shape in its periphery, teeth of corresponding truncated wedge-shape held in said slots, a locking key beneath the respective teeth, and juxtaposed grooves and tenons formed in a radial direction in contiguous faces of said slots and cutter teeth, respectively, to prevent sidewise movement of the teeth in the slots.

HIRAM B. McDONALD.